UNITED STATES PATENT OFFICE.

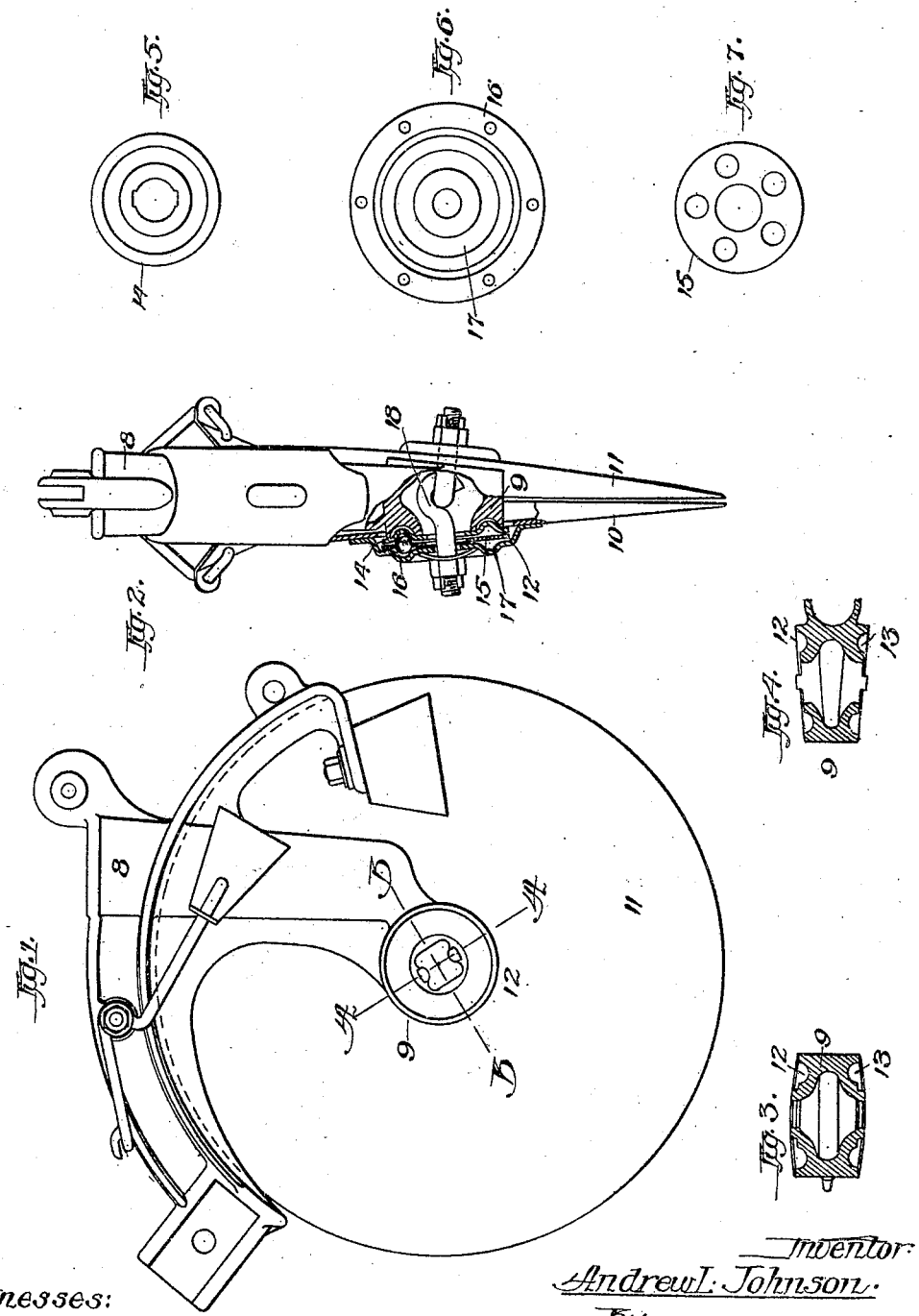

ANDREW L. JOHNSON, OF HAMILTON, CANADA, ASSIGNOR TO INTERNATIONAL HARVESTER COMPANY, A CORPORATION OF NEW JERSEY.

GRAIN-DRILL.

No. 806,895.  Specification of Letters Patent.  Patented Dec. 12, 1905.

Application filed June 10, 1905. Serial No. 264,573.

*To all whom it may concern:*

Be it known that I, ANDREW L. JOHNSON, a citizen of the United States, residing at Hamilton, in the county of Wentworth and Province of Ontario, Dominion of Canada, have invented certain new and useful Improvements in Grain-Drills, of which the following is a specification, reference being had to the accompanying drawings, forming a part thereof.

This invention relates to grain-drills, and particularly to that type provided with double-disk furrow-openers mounted upon opposite sides of a disk-support.

It consists in an improved ball-bearing for the disks and securing means therefor that is adapted to allow the disks to be placed at an angle with each other, the objects being to provide a substantial bearing for the disks to rotate upon and to hold them in position by a single rotatable connection. These objects are attained by the mechanism illustrated by the accompanying drawings, in which—

Figure 1 is a side view of a disk-support with one disk removed. Fig. 2 is a rear view, partly in section, of Fig. 1. Fig. 3 is a section of the bearing of the disk-support on line A A of Fig. 1. Fig. 4 is a section on line B B of Fig. 1. Fig. 5 is a plan view of a steel ball-race adapted to fit upon the disk-support. Fig. 6 is a complementary steel ball-race adapted to be secured to the disks, and Fig. 7 is a ball-retainer.

The same reference-numerals designate similar parts throughout the several views.

8 is the disk-support, which may be of any common form in so far as the seed-tube and means for attachment to the drag-bar connections are considered. The disk-support is provided at its lower end with a hub portion 9, having opposite end surfaces that incline downward and forward in the well-known way for the purpose of receiving the disks 10 and 11, that are at an angle with each other, to adapt them for use as furrow-openers. The end surfaces of the portion 9 are provided with grooves 12 and 13, and 14 is a hardened-steel plate having a corresponding groove in its outer face and a projecting annular inner surface adapted to be received by the groove in the face of the hub.

15 is a ball-retaining plate having openings to receive the balls, and 16 is a hardened-steel plate secured to the disks and having formed therein a groove 17, that coincides with the grooves 12 and 13 in the hub or the groove in the plate 14, forming a ball-race of common form.

The hub portion 9 is hollow, and 18 is a flexible bolt screw-threaded at its outer ends and provided with nuts bearing against flexible washers 19 and operative to hold the various parts of the bearing in place. The bolt 18 consists of two parts hooked together forming a universal joint, and as the disks revolve in planes that are angular to each other there will be a slight movement of the two parts relative to each other. If the ball-race be made true and the steel plates are not warped, the flexible washers are not necessary. The gist of the invention is the single means for holding the two disks in operative position in planes that are inclined relative to each other or upon oppositely-disposed axes that are so inclined.

What I claim as my invention, and desire to secure by Letters Patent, is—

1. In a double-disk grain-drill, the combination of a disk-support comprising a hollow hub, the end faces thereof being angularly arranged relative to the line of draft of the machine and provided with annular grooves, furrow-opening disks having complementary annular grooves coinciding with the grooves in said hub, balls seated in the grooves, and a single holding means for retaining said disks in operative position, comprising a two-part bolt having a universal-joint connection within said hollow hub.

2. In a double-disk grain-drill, the combination of a disk-support comprising a hollow hub, the end faces thereof being angularly arranged relative to the line of draft of the machine and provided with annular grooves, metal plates having projecting annular inner surfaces adapted to be received by the grooves in the end faces of the hub and having annular grooves in their outer faces, furrow-opening disks having axial openings therein, metal plates secured to said disks and covering said axial openings and having annular grooves coinciding with the grooves in the outer surfaces of said first-mentioned plates, and a single holding means for retaining said disks in operative position, comprising a two-part bolt having a universal-joint connection within said hollow hub.

In witness whereof I hereto affix my signature in presence of two witnesses.

ANDREW L. JOHNSON.

Witnesses:
ROBT. C. LIVESAY,
ARNT W. ESSMAN.